US009677968B2

(12) United States Patent
Griffiths et al.

(10) Patent No.: US 9,677,968 B2
(45) Date of Patent: Jun. 13, 2017

(54) REMOTELY CONTROLLED AND THERMALLY MANAGED SYSTEM FOR ACTUATION OF COMPONENTS IN A WIND TUNNEL MODEL

(71) Applicant: The Boeing Company, Chicago, IL (US)

(72) Inventors: Robert C. Griffiths, Seattle, WA (US); James Henry Mabe, Seattle, WA (US); Stefan Bieniawski, Chicago, IL (US); Frederick Calkins, Renton, WA (US); Jonathan K. Brown, Renton, WA (US); Ordie Dean Butterfield, Bonney Lake, WA (US); Frank Bruce Irvine, Chicago, IL (US)

(73) Assignee: The Boeing Company, Chicago, IL (US)

( * ) Notice: Subject to any disclaimer, the term of this patent is extended or adjusted under 35 U.S.C. 154(b) by 90 days.

(21) Appl. No.: 14/788,694

(22) Filed: Jun. 30, 2015

(65) Prior Publication Data
US 2017/0003194 A1  Jan. 5, 2017

(51) Int. Cl.
*G01M 9/04* (2006.01)
(52) U.S. Cl.
CPC .................... *G01M 9/04* (2013.01)
(58) Field of Classification Search
CPC .......... H02N 10/00; G01M 9/04; G01M 9/00; G01M 9/02
USPC .............................................. 60/527; 73/147
See application file for complete search history.

(56) References Cited

U.S. PATENT DOCUMENTS

| | | | |
|---|---|---|---|
| 6,065,934 A | 5/2000 | Jacot et al. | |
| 6,322,324 B1 | 11/2001 | Kennedy et al. | |
| 6,453,669 B2 | 9/2002 | Kennedy et al. | |
| 6,499,952 B1 | 12/2002 | Jacot et al. | |
| 7,037,076 B2 | 5/2006 | Jacot et al. | |
| 7,753,316 B2 | 7/2010 | Larssen et al. | |
| 7,878,459 B2 | 2/2011 | Mabe et al. | |
| 8,469,315 B2* | 6/2013 | Larssen .................... B64C 7/00 244/199.4 |
| 8,499,913 B2 | 8/2013 | Gunter | |
| 8,662,443 B2 | 3/2014 | Gunter et al. | |
| 8,726,652 B1 | 5/2014 | Gunter | |

(Continued)

*Primary Examiner* — Michael A Lyons
*Assistant Examiner* — Philip Cotey
(74) *Attorney, Agent, or Firm* — McDonnell Boehnen Hulbert & Berghoff LLP (57) ABSTRACT

Within examples, remotely controlled and thermally managed systems for actuation of components in a wind tunnel model are described. A wind tunnel test environment may provide ambient to cryogenic temperature conditions to reproduce aerodynamic flight Reynolds number conditions. Example systems comprise a modular test assembly mounted on a test component, and the test component includes at least one movable surface and is configured for placement in the wind tunnel. An actuator is included within the modular test assembly and coupled to the at least one movable surface of the test component, and a temperature sensor is included to provide temperature of an exterior of the modular test assembly. In addition, a controller is in communication with the actuator and the temperature sensor, and is configured to remotely cause the actuator to move the at least one movable surface through a range of motion.

20 Claims, 9 Drawing Sheets

(56) References Cited

U.S. PATENT DOCUMENTS

| | | | |
|---|---|---|---|
| 8,876,046 B2 | 11/2014 | Gunter et al. | |
| 2007/0221789 A1* | 9/2007 | Lee | B64C 9/18 244/211 |
| 2009/0179109 A1* | 7/2009 | Akkermann | G01M 9/08 244/75.1 |
| 2010/0018322 A1* | 1/2010 | Neitzke | F15D 1/12 73/861.22 |
| 2012/0060491 A1* | 3/2012 | Gunter | F03G 7/065 60/527 |
| 2012/0325325 A1* | 12/2012 | Quackenbush | F02C 7/04 137/1 |
| 2015/0013445 A1* | 1/2015 | Kordt | G01M 9/062 73/147 |

* cited by examiner

REMOTELY CONTROLLED AND THERMALLY MANAGED SYSTEM FOR ACTUATION OF COMPONENTS IN A WIND TUNNEL MODEL

FIELD

The present disclosure relates generally to methods and systems for remotely controlling and remotely actuating components in a wind tunnel test environment under ambient to cryogenic temperature conditions to reproduce aerodynamic flight Reynolds number conditions.

BACKGROUND

Wind tunnel models typically require movable control surfaces to allow simulation of various control aspects of a vehicle being modeled. Unmotorized surfaces are often used due to their simplicity and ability to operate at extreme temperatures. However, such surfaces must be positioned by hand requiring interruption of testing to position the surfaces at desired control angles. Thus, existing solutions require removal and/or isolation of the model from the wind tunnel environment to make configuration changes.

Models are typically of reduced scale, and therefore, full size actuators which would be employed in actual vehicles are not readily adaptable for use. Various actuation systems have been employed in wind tunnel models including electromechanical actuators. However, electromechanical actuation is relatively bulky because of low power densities and the need for complex electric motor/gear assemblies. As such, the amount of space required in the supporting structure (for example, in a vertical tail of an aircraft) may limit the amount of instrumentation, such as pressure sensors, that can be installed in the model and may reduce a structural strength which tends to limit their use to lower pressure tunnels having lower loads. Lower pressure tunnels do not match the aerodynamic characteristics of a full scale aircraft as well which limits their fidelity as design tools for testing aircraft configurations.

It is therefore desirable to provide an actuation system for use in models, or other temperature restricted applications, to improve wind tunnel test efficiency by reducing a number of times the wind tunnel has to be opened to complete model changes while providing an actuator with sufficient force capability for higher pressure wind tunnels.

SUMMARY

In one example, a system for remotely controlling and remotely actuating components in a wind tunnel test environment under ambient to cryogenic temperature conditions to reproduce aerodynamic flight Reynolds number conditions is described. The system comprises a modular test assembly mounted on a test component, and the test component includes at least one movable surface and is configured for placement in the wind tunnel. The system also includes an actuator included within the modular test assembly and coupled to the at least one movable surface of the test component, a temperature sensor to provide temperature of an exterior of the modular test assembly, and a controller in communication with the actuator and the temperature sensor and configured to remotely cause the actuator to move the at least one movable surface through a range of motion.

In other examples, a method for remotely controlling and remotely actuating components in a wind tunnel test environment under ambient to cryogenic temperature conditions to reproduce aerodynamic flight Reynolds number conditions is described. The method comprises causing, via thermal actuation, an actuator to move at least one movable surface of a test component in the wind tunnel test environment through a range of motion, and the actuator is included within a modular test assembly and is coupled to the at least one movable surface. The method also includes receiving a temperature of an exterior of the modular test assembly, and based on the temperature of the exterior of the modular test assembly, causing cooling of an interior of the modular test assembly to maintain the temperature conditions in the wind tunnel test environment during actuation of the actuator.

In still other examples, a non-transitory computer readable medium having stored thereon instructions that, upon being executed by a computing device, cause the computing device to perform functions is described. The functions comprise causing, via thermal actuation, an actuator to move at least one movable surface of a test component in a wind tunnel test environment through a range of motion, and the actuator is included within a modular test assembly and is coupled to the at least one movable surface. The functions also include receiving a temperature of an exterior of the modular test assembly, and based on the temperature of the exterior of the modular test assembly, causing cooling of an interior of the modular test assembly to maintain the temperature conditions in the wind tunnel test environment during actuation of the actuator. The temperature conditions in the wind tunnel test environment provide ambient to cryogenic temperature conditions to reproduce aerodynamic flight Reynolds number conditions.

The features, functions, and advantages that have been discussed can be achieved independently in various embodiments or may be combined in yet other embodiments further details of which can be seen with reference to the following description and drawings.

BRIEF DESCRIPTION OF THE FIGURES

The features believed characteristic of the illustrative embodiments are set forth in the appended claims. The illustrative embodiments, however, as well as a preferred mode of use, further objectives and descriptions thereof, can be understood by reference to the following detailed description of illustrative embodiments of the present disclosure when read in conjunction with the accompanying drawings.

DETAILED DESCRIPTION

Disclosed embodiments will now be described more fully hereinafter with reference to the accompanying drawings, in which some, but not all of the disclosed embodiments are shown. Indeed, several different embodiments may be described and should not be construed as limited to the embodiments set forth herein. Rather, these embodiments are described so that this disclosure will be thorough and complete and will fully convey the scope of the disclosure to those skilled in the art.

Wind tunnel testing for any given aircraft program is generally expensive due in large part to testing stoppage to make configuration changes. Traditional high pressure wind tunnels, which may provide 25%-30% flight Reynolds number, are used for testing, and generally require approximately 30 minutes to make a single configuration change of the aircraft.

Cryogenic wind tunnels add a further complication due to the fact that such testing environments use large quantities of liquid nitrogen (LN2) converted to gaseous nitrogen (GN2) under high pressure (e.g., up to 9 atmospheres) to create an environment having temperatures between about −250° F. to about 100° F. A benefit of cryogenic wind tunnels are their ability to obtain flight Reynolds number conditions by reproducing aerodynamic flight conditions with a sub-scale wind tunnel model. Acquiring flight Reynolds number aerodynamic data during aircraft testing enables risk reduction prior to developing final lines or flight tests. But, use of cryogenic wind tunnels generally increases an amount of time required to make configuration changes to the aircraft. Further, due to their specialized nature, large cryogenic wind tunnels are few in number.

An ability to quickly and remotely actuate components (e.g., aircraft parts) while the aircraft (or other cryogenically tested device) is within a cryogenic environment is described below. A system is developed capable of actuating control surfaces, and may be used for any device in an extreme environment, while managing extreme thermal temperature conditions.

Within examples herein systems for controllable and remote actuation of components in extreme thermal environments for aircraft model testing are described. Remote actuation under ambient to cryogenic variable pressure conditions (such as high pressure environments for flight Reynolds number aircraft model testing) may help improve wind tunnel testing of aircraft components, as well as provide cost savings due to reduced model change time and decreased airplane performance risks. Thermal management can be provided and extends to aircraft applications under severe thermal environments experienced by full scale aircraft control surfaces (e.g., −250 F to +100 F or more).

Shape memory alloys (SMAs) or similar alloys for hinged devices can be used, through thermal management, to cover both ambient and full cryogenic test conditions of aircraft components through a range of motion. Within examples using such SMAs, no removal or purging of the wind tunnel environment is necessary to reposition the component or to cause the component to move through a range of motion. This reduces a threat of moisture entering the wind tunnel environment, and moisture measure in a range of about 1-2 ppm can cause test data results to be unreliable. Further, multiple more configurations of the component can be tested by dynamically re-configured positioning using the SMA actuated component so that different control surface deflections are tested depending on real-time data results, rather than removing the model and risking contamination within the wind tunnel environment.

Figure 1:
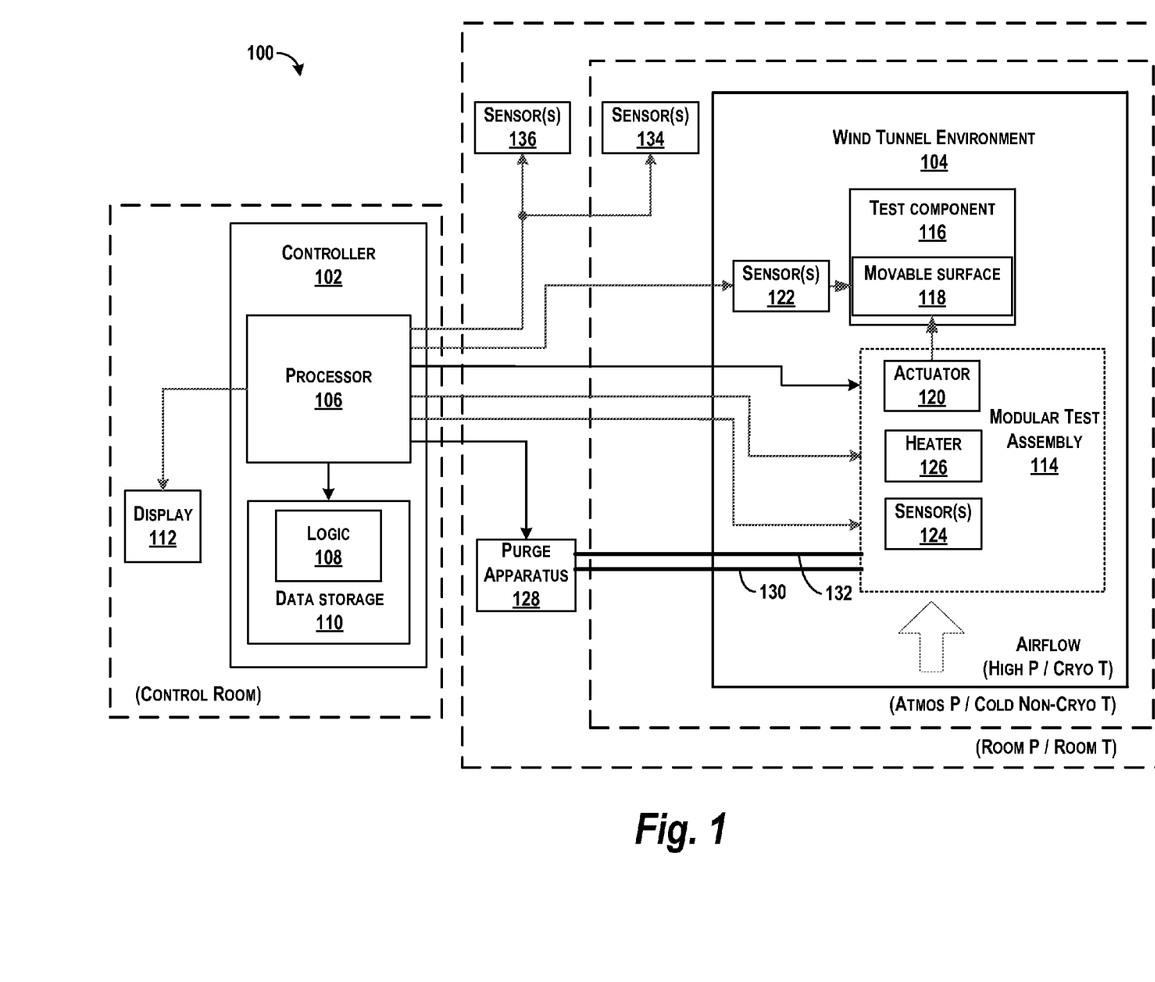
FIG. 1 is a system for remotely controlling and remotely actuating components in a wind tunnel test environment under ambient to cryogenic temperature conditions to reproduce aerodynamic flight Reynolds number conditions, according to an example embodiment.
Figure 2:
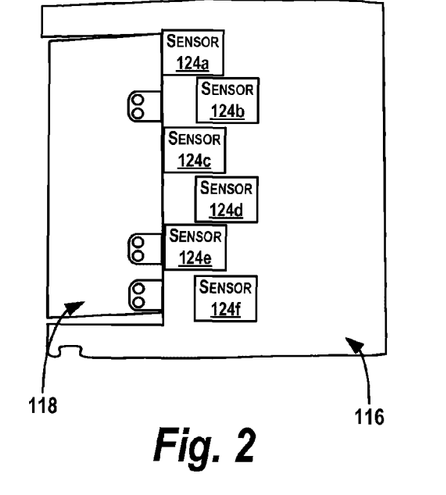
FIG. 2 illustrates a top view of the test component and movement of the movable surface through a range of motion, according to an example embodiment.
Figure 3:
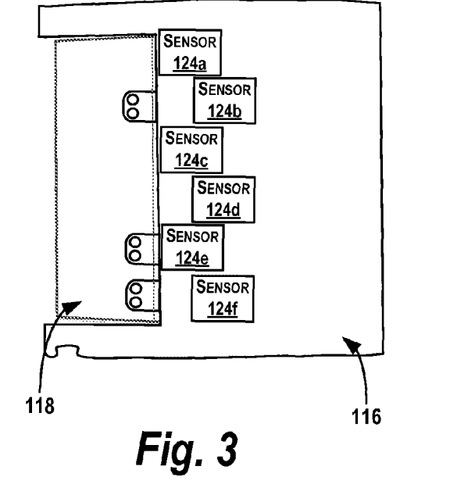
FIG. 3 illustrates another top view of the test component and movement of the movable surface through a range of motion, according to an example embodiment.
Figure 4:
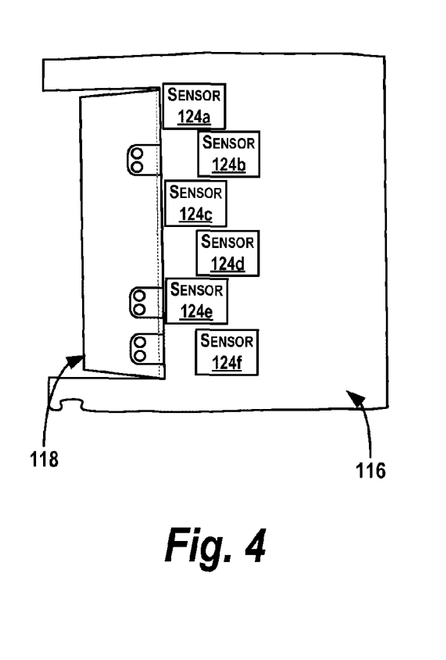
FIG. 4 illustrates another top view of the test component and movement of the movable surface through a range of motion, according to an example embodiment.
Figure 5:
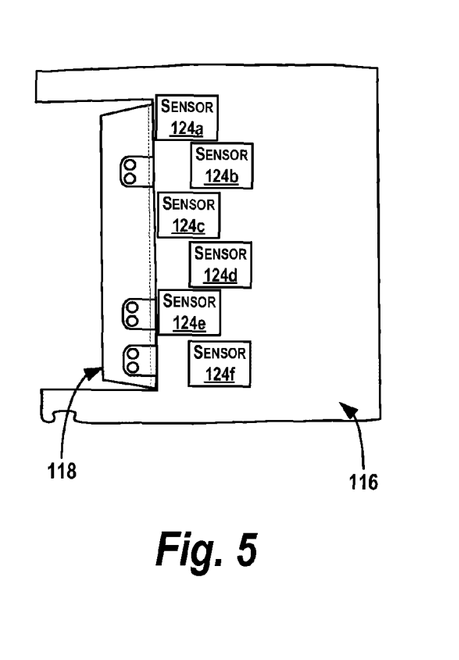
FIG. 5 illustrates another top view of the test component and movement of the movable surface through a range of motion, according to an example embodiment.

Referring now to the figures, FIG. 1 is a system 100 for remotely controlling and remotely actuating components in a wind tunnel test environment under ambient to cryogenic temperature conditions to reproduce aerodynamic flight Reynolds number conditions, according to an example embodiment. The system 100 includes a controller 102 that remotely controls operations of components in a wind tunnel environment 104. The controller includes a processor 106 that may execute logic 108 stored in data storage 110 to control the operations, and the controller 102 is in communication with a display 112 to display outputs representative of the operations and test results.

The controller 102 may be representative of any kind of computing device or controller, or may be a portion of another apparatus as well, such as an apparatus included entirely within a server and portions of the controller 102 may be elsewhere or located within other computing devices.

The controller 102 may be included within a control room that is separate from the wind tunnel environment 104, or segregated from the wind tunnel environment 104 by enclosures that seal the wind tunnel environment 104.

The wind tunnel environment 104 is a testing environment with controlled temperatures and pressures. A modular test assembly 114 is included in the wind tunnel environment mounted on or coupled to a test component 116. Within examples, the test component 116 includes at least one movable surface 118 and is configured for placement in the wind tunnel for testing. An actuator 120 is included within the modular test assembly 114 and coupled to the least one movable surface 118 of the test component 116.

The test component 116 may be a component of an aircraft, such as a wing of an aircraft, and the movable surface 118 may be a flap on the wing of the aircraft. The actuator 120 can be coupled to a hinge of the flap to move the flap through the range of motion. The test component 116 may be numerous other components of an aircraft or other flight control surfaces, such as an aileron and the actuator 120 can be coupled to the aileron to move the aileron through a range of deflections for rolling and banking testing or simulations, for example. Other example test components 116 include slats, spoilers, flaperons, moveable winglets, rudders, elevators, propellers, moveable stabilizers, landing gear mechanisms, inlet and nozzle movements, trim tabs, etc.

The test component 116 may still be other numerous components of other vehicles or non-vehicles as well that operate in extreme temperature conditions and testing of such components can occur in the wind tunnel environment.

In addition, sensors 122 are provided coupled to the test component 116, such as to the movable surface 118, to detect and output information representative of movement of the movable surface 118. The sensors 122 may also include pressure or temperature sensors to provide information representative of a pressure or a temperature in the wind tunnel environment 104 and exterior of the modular test assembly 114. Furthermore, additional sensors 124 are provided in the modular test assembly 114, such as additional temperature or pressure sensors, so as to provide temperature and pressure of an interior of the modular test assembly 114.

The modular test assembly 114 further includes a heater 126, coupled to the processor 106 of the controller, to thermally actuate the actuator 120. The modular test assembly 114 provides a thermally isolated area within the wind tunnel environment 104 such that a boundary layer between the modular test assembly 114 and the wind tunnel environment 104 is thermally managed to prevent disturbance of temperature conditions in the wind tunnel environment 104 during thermal actuation of the SMA tubes. In some examples, the modular test assembly 114 further includes an insulating material lining an inside or interior surface, such as fiberglass, to prevent heat dissipation.

The processor 106 of the controller 102 is in communication with the actuator 120 and the sensors 122 and 124, and is configured to remotely cause the actuator 120 to move the at least one movable surface 118 through a range of motion so as to execute testing of the test component 116 in the wind tunnel environment 104. The processor 106 controls the heater 126 to cause actuation of the actuator 120, for example.

The actuator 120 may include shape memory alloy (SMA) tubes that are thermally actuated to cause movement of the at least one movable surface 118. For example, based on thermal actuation of the SMA tubes, the SMA tubes twist causing movement of the at least one movable surface 118. Shape memory alloys (SMA) form a group of metals that have useful thermal and mechanical properties. As an example, an SMA material such as Nitinol may be deformed while in a martensitic state (low yield strength condition) and then heated to its transition temperature to reach an austenitic state, so that the SMA material will resume its austenitic shape. A rate of return to the austenitic shape depends upon an amount and rate of thermal energy applied to the SMA. SMA actuators are useful in a wide variety of contexts, including aircraft-related contexts, to actuate particular devices.

Representative materials suitable for manufacturing SMA actuators in accordance with any of the examples described herein include Nitinol. In a particular example, the Nitinol can be 55% by weight nickel and 45% by weight titanium. In a further example, the Nitinol can have an equi-atomic composition, with 50% nickel molecules and 50% titanium molecules. Other suitable materials for SMAs include Nitinol with 57% or 60% nickel by weight, and/or nickel/titanium alloys with additional constituents (e.g., palladium and/or platinum) to increase a transition temperature, and/or to attain other material properties.

Within examples, the actuator 120 may include SMAs may be tubes of about ⅛ to about ⅜ inches in diameter, such as for test components with movable surfaces of about 9 inches in length. Other examples include a ¼ inch diameter tube used for a 5 inch long test component.

As shown in FIG. 1, the wind tunnel environment 104 may provide ambient to cryogenic temperature conditions by using liquid nitrogen (LN2) converted to gaseous nitrogen (GN2) under high pressure (e.g., up to 9 atmospheres) to create an environment having temperatures in a range of about −250° F. to about 100° F. Such high pressures and low temperatures simulate actual flight conditions of an aircraft, for example. Thus, the region shown in FIG. 1 outlined by the wind tunnel environment 104 may be the high pressure and cryogenic temperature region of the wind tunnel in which wind is blowing over the test component 116 to simulate the flight conditions.

Surrounding the wind tunnel environment 104, a second region includes the pressure dropping (e.g., such as to atmospheric pressure) and the temperature increasing to non-cryogenic temperatures (e.g., such as to 0° F. or higher). Areas marked surrounding the wind tunnel environment 104 in FIG. 1 may still be within an enclosed area for the wind tunnel, but illustrate that the high pressure/cryogenic temperature region may be focused on the component undergoing testing. Further, outside of this second region, the pressure drops further to room pressures (e.g., 1 atm) and the temperature increases to room temperature (e.g., 60° F. to 80° F.).

Because the actuator 120 is thermally actuated to cause movement of the at least one movable surface 118 of the test component 116, the controller 102 further receives the temperature of the exterior of the modular test assembly 114 from the sensor 122, and when such temperature exceeds a threshold (e.g., is over a desired cryogenic temperature due to heating of the actuator 120), the controller 102 is programmed to cause cooling of an interior of the modular test assembly 114 to maintain the temperature conditions in the wind tunnel environment 104 during actuation of the actuator 120.

To do so, within examples, the system includes a purge apparatus 128 within or adjacent to the wind tunnel environment 104 and connected to the interior of the modular test assembly 114 via purge lines 130 and 132. More or fewer purge lines may be provided. The processor 106 of the controller 104 is coupled to the purge apparatus 128 to cause cooling of the interior of the modular test assembly 114 by providing cold nitrogen gas into the modular test assembly 114 through the purge lines 130 and 132 for active cooling.

Thus, within examples, using SMAs as the actuator 120 requires thermal actuation. When heating the actuator 120 in a cryogenic environment of the wind tunnel environment 104, ambient heat can potentially impact a boundary layer between an interior and an exterior of the modular test assembly 114 that has the potential to corrupt air flow generated by the wind tunnel environment. Using the system 100, the actuator 120 can be heated for actuation, causing movement of the movable surface 118 in a cryogenic environment, without disrupting the cryogenic environment by simultaneously or subsequently providing cold nitrogen gas inside the modular test assembly 114 to control temperatures. The controller 102 determines temperatures at an exterior of the modular test assembly 114 from the sensor 122, and can adjust temperatures inside the modular test assembly 114 to avoid corruption of the cryogenic environment while maintaining temperatures required to move the actuator (e.g., SMA) inside the modular test assembly 114.

The controller 102 controls the temperature of an interior of the modular test assembly such that substantially constant temperature conditions result in the wind tunnel environment 104 during actuation of the actuator 120 and non-actuation of the actuator 120. In this manner, use of the actuator 120 does not affect the cryogenic conditions of the wind tunnel environment 104.

As a specific example, to actuate the actuator 120, the actuator 120 may have a transition temperature of about 70° C. up to about 150° C., and the modular test assembly 114 prevents such increased temperatures from leaking outside to the test component 116 surfaces by providing an enclosed area for actuation of the actuator 120 as well as enabling the purge lines 130 and 132 to actively cool the interior of the modular test assembly 114 for thermal management.

Cryogenic temperatures may be needed to fully simulate aircraft flight conditions, and electronically controlled actuators may not operate in such low temperature environments. Further, unmotorized surfaces require manual positioning by hand, which necessitates interruption of testing to position the surfaces at desired control angles. The system 100 in FIG. 1 enables testing of components at actual flight Reynolds number and cryogenic conditions through remote actuation. The SMA actuator 120 enables remote control of the movable surface in a cryogenic environment, and thermal management of the SMAs can be performed to prevent disruption of the cryogenic environment. Remote control and actuation further enables testing of many configurations of a component or combinations of many configurations in far less time.

Example simulations or testing of aircraft components within the system 100 in FIG. 1 may include testing of components on the empennage or tail assembly including auxiliary power unit (APU) doors for exhaust outlet, and testing components of the propulsion system including inlet and nozzles for varying flow. Still further example testing of aircraft components includes testing components of fuselage and interiors including cargo door components, and testing components of landing gear including actuation for main gear, nose gear, and landing gear doors. Yet further testing of aircraft components includes testing components of the wings such as leading edge devices (i.e., Krueger flap), trailing edge devices (i.e., adaptive trailing edge (ATE) device), folding wing tips, deployable vortex generator (VG), and deployable nacelle chines, and testing components of other aircraft systems such as environmental control system (ECS) doors, ram inlet doors, or vacuum relief doors.

The system 100 in FIG. 1 illustrates the sensors 122 and 124, and more sensors may be included as well, such as a plurality of data sensors for providing data indicative of one or more conditions in the wind tunnel environment 104 including additional temperature sensors or pressure sensors. The controller 102 may be in communication with the additional sensors as well.

As an example, additional sensors may include wind tunnel calibration sensors 134 and 136 positioned within the different regions of the wind tunnel environment 104 so that combined with the sensor 122, characteristics of all regions of the wind tunnel environment 104 can be determined. Each of the sensors 122, 134, and 136 are coupled to the processor 106 and can output temperature, pressure, wind flow velocity, etc. to the processor 106 for determination of baseline characteristics of the wind tunnel environment 104 prior to testing. Since the wind tunnel environment 104 is a testing environment with controlled temperatures and pressures, such calibration sensors 134 and 136 are helpful to provide baseline of the system 100 before operational testing to characterize heat mass flow rates of the system 100. Once the baseline characteristics are known (e.g., what the wind tunnel environment 104 looks like before testing), any heat transfer effects can be more easily determined during testing. Example baseline characteristics to determine include a temperature and pressure on the test component 116 before and after testing, and temperatures and pressures in all regions of the wind tunnel environment 104 before and after testing.

Further, although shown as direct communication lines or wired communication in FIG. 1, the controller 102 may be in wired and/or wireless communication with any of the components including the actuator 120 and the sensors 122 and 124 of the system 100.

FIGS. 2-5 illustrate a top view of the test component 116 and movement of the movable surface 118 through a range of motion, according to an example embodiment. The test component 116 is shown with sensors 124a-f installed on a surface to provide various outputs including temperature, pressure, and amounts of actuation or amounts of deflection of the movable surface 118. The actuator 120 is coupled to an underside of the test component 116, and causes movement of the movable surface 118 (e.g., flap) between its initial stowed position of about 0° deflection shown in FIG. 2 and a fully deployed position shown in FIG. 5 of about 65° deflection. Within examples, the SMA actuator 120 can be connected between one or more flap brackets or hinges to cause movement of the flap. Movement of the flap from the stowed to deployed positions in the range of motion shown in FIGS. 2-5 may be accomplished in less than about 2 minutes, for example.

Figure 6:
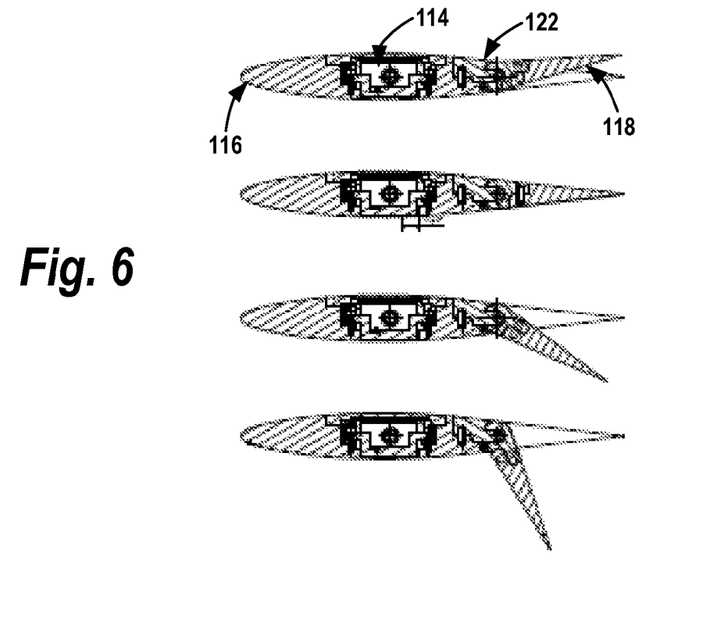
FIG. 6 illustrates a side view of the test component and the movable surface as the moveable surface is moved through a range of motion described in FIGS. 2-5, according to an example embodiment.

FIG. 6 illustrates a side view of the test component 116 and the movable surface 118 as the moveable surface 118 is moved through a range of motion described in FIGS. 2-5, according to an example embodiment. The moveable surface 118 is initially stowed and is shown to move to a deflection of about 65°, for example.

Figure 7:
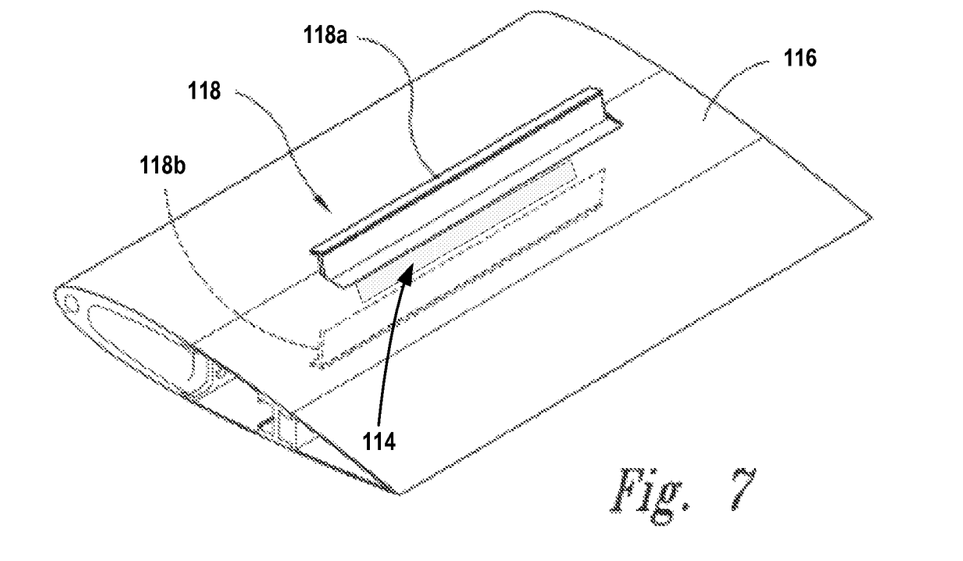
FIG. 7 illustrates an exploded view of an underside of the test component, the movable surface, and the modular test assembly, according to an example embodiment.

FIG. 7 illustrates an exploded view of an underside of the test component 116, the movable surface 118, and the modular test assembly 114, according to an example embodiment. The movable surface 118 is coupled to the test component 116 via hinges (shown in FIG. 8). The modular test assembly 114 can be mounted on an underside of the test component 116 and coupled to the hinges so as to cause movement of the movable surface 118, for example. The test component 116 can include two deployable or movable surfaces 118, e.g., a first deployable device 118a which is visible in FIG. 7, and a second deployable device 118b described below with reference to FIG. 8. The deployable devices 118 can be operated with rotary SMA actuators, as is described further below.

Figure 8:
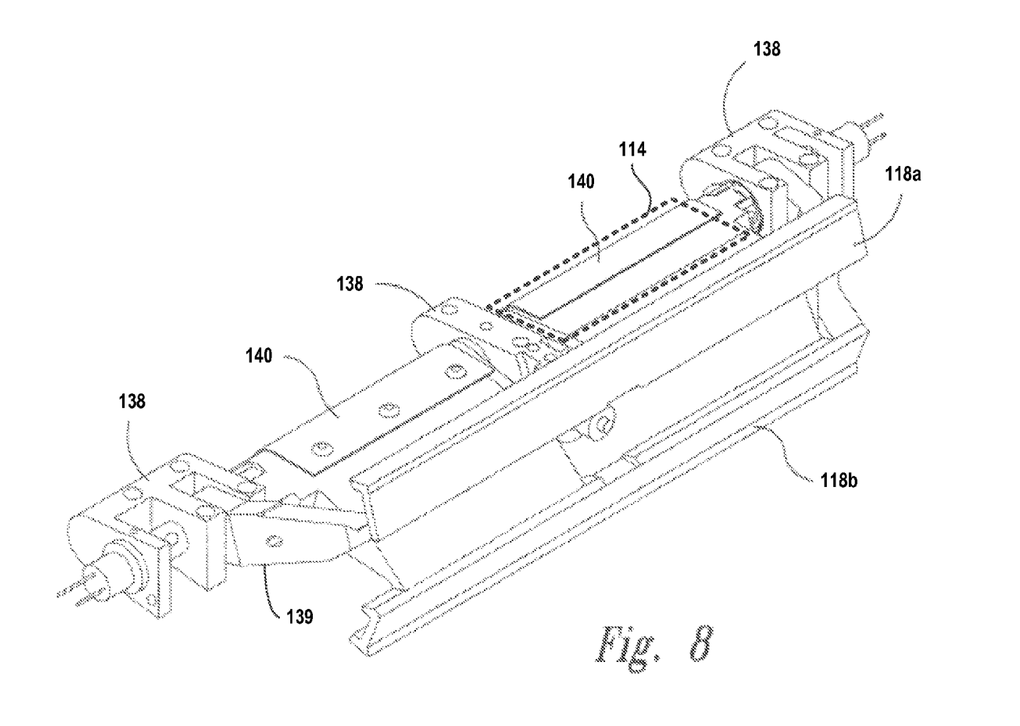
FIG. 8 is a partially schematic, isometric illustration of the first and second deployable devices and associated hardware, removed from the test component shown in FIG. 7.

FIG. 8 is a partially schematic, isometric illustration of the first and second deployable devices 118a-b and associated hardware, removed from the test component 116 shown in FIG. 7. The deployable devices 118a and 118b are supported relative to the test component 116 with brackets 138 that include hinges 139. Return springs 140 can return the deployable devices 118a and 118b to their stowed positions without a need for simultaneously activating a corresponding SMA actuator, as is described further below. The modular test assembly 114 is shown which encloses the actuator 120, heater 126, and sensors 124 visible in FIG. 9 below.

Figure 9:
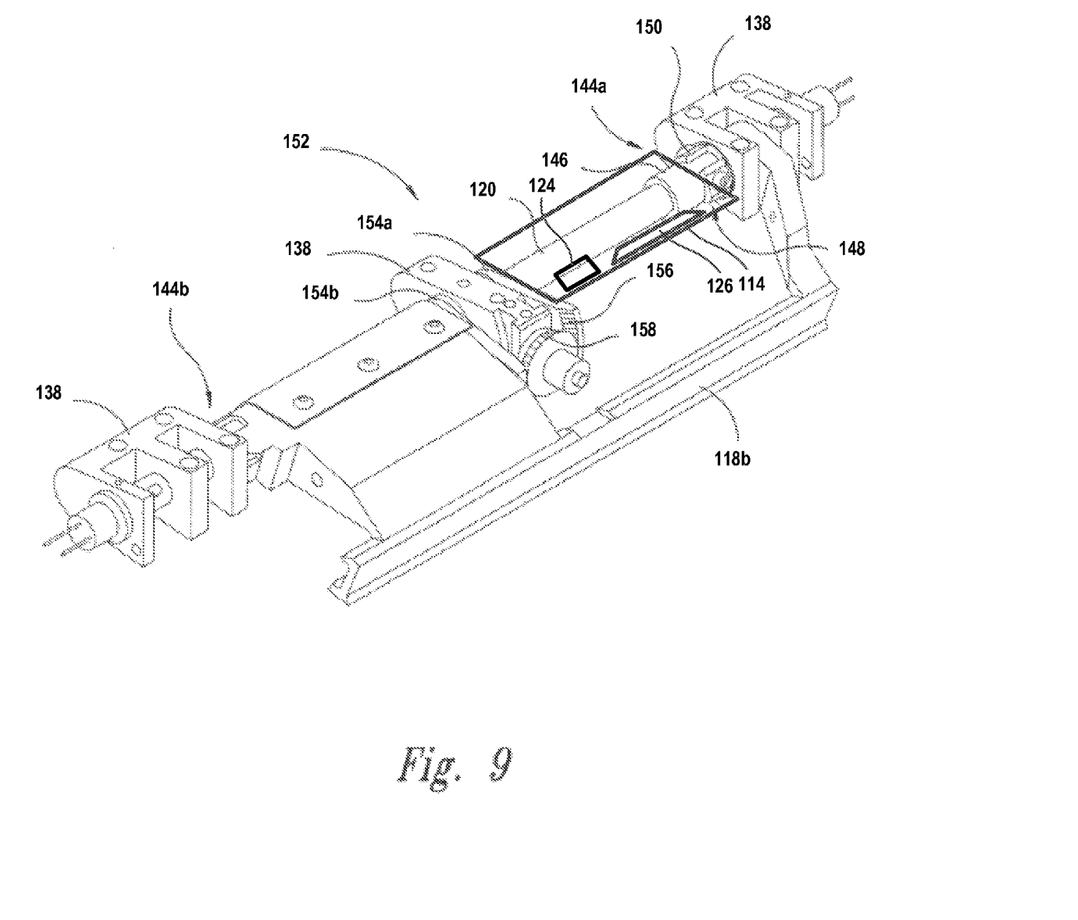
FIG. 9 is another isometric view of the arrangement shown in FIG. 8, with the first deployable device removed to expose internal features of the arrangement.

FIG. 9 is another isometric view of the arrangement shown in FIG. 8, with the first deployable device 118a removed to expose internal features of the arrangement. The arrangement includes a single SMA actuator 120 that is free to rotate with respect to the brackets 138, and is included in the modular test assembly 114 along with the sensors 124 and the heater 126. The SMA actuator 120 is coupled toward opposing ends to corresponding drivers 144 (including a first driver 144a that is visible in FIG. 9 and a second driver 144b that is not visible in FIG. 9). A connector shaft 146 provides the connection between the SMA actuator 120 and the drivers 144a and 144b. The connector shaft 146 also extends through the brackets 138 so that if the SMA actuator 120 fails, the corresponding deployable device is still carried in position relative to the test component 116 (FIG. 7).

In a particular embodiment, each driver 144 includes a spline 148 having at least one first spline element 150 that selectively engages with a corresponding spline element carried by one of the deployable devices 118a and 118b. As the SMA actuator 120 twists about its longitudinal axis, the first and second drivers 144a and 144b rotate in opposite directions. During at least a portion of this relative movement, the drivers 144a and 144b move the corresponding deployable devices 118a and 118b in opposite directions. The motion of the two devices 118a and 118b is coordinated by a motion coordinator 152. In a particular embodiment, the motion coordinator 152 can include first and second opposing coordination arms 154a and 154b, each of which is carried by a corresponding one of the deployable devices 118a and 118b (e.g., the second coordination arm 154b is carried by the second deployable device 118b). Each coordination arm 154a and 154b includes a rack 156 that engages with a centrally located pinion 158. When one of the deployable devices 118a and 118b moves, the pinion 158 transmits the motion to other deployable device 118a and 118b so as to move the other deployable device by the same amount in the opposite direction.

Figure 10:
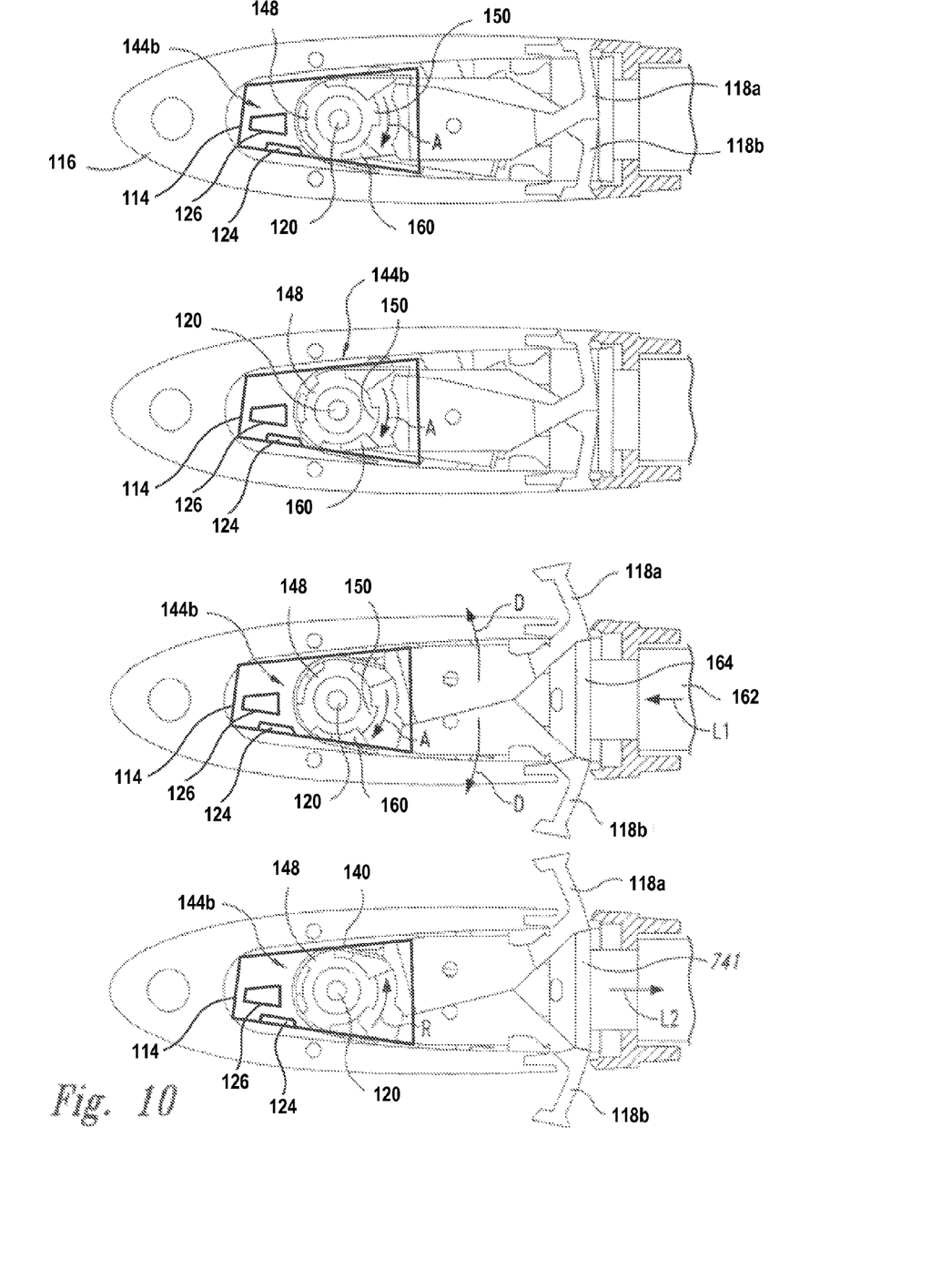
FIG. 10 is partially schematic, cross-sectional illustrations of the test component, showing the SMA actuator and the second driver of FIG. 9 during various phases of operation, and the SMA actuator is included in the modular test assembly with the heater and the sensors.

FIG. 10 is partially schematic, cross-sectional illustrations of the test component 116, showing the SMA actuator 120 and the second driver 144b of FIG. 9 during various phases of operation, and the SMA actuator 120 is included in the modular test assembly 114 with the heater 126 and the sensors 124. As shown in FIG. 10, the second driver 144b includes a spline 148 having a first spline element 150. As the SMA actuator 120 twists, the first spline element 150 rotates as indicated by arrow A until it engages a corresponding second spline element 160 carried by the second deployable device 118b (FIG. 10). If the first driver 144a (FIG. 9) has not yet engaged with a corresponding second spline element carried by the first deployable device 118a (FIG. 9), then in a particular embodiment, the SMA actuator 120 continues to twist without further rotating the second driver 144b. When, for both the first and second drivers 144a and 144b, the first spline element 150 engages the corresponding second spline element 160 (as shown in FIG. 10), continued twisting by the SMA actuator 120 causes the first deployable device 118a and the second deployable device 118b to rotate away from each other, as indicated by arrows D. This motion is coordinated by the motion coordinator 152 described above with reference to FIG. 9.

At the end of the relative motion between the first and second deployable devices 118a and 118b, a lock 162 can deploy a lock element 164, as indicated by arrow L1, to hold the deployable devices 118a and 118b in their deployed positions or at least inhibit motion of the deployable devices 118a and 118b. With the lock element 164 in this first or locked position, the SMA actuator 120 can unwind or relax, as indicated by arrow R in FIG. 10. At the same time, the deployed lock element 164 can maintain the first and second deployable devices 118a and 118b in their deployed positions. When it is desired to retract the deployable devices 118a and 118b, the lock element 164 can retract to a second or unlocked position, as indicated by arrow L2 in FIG. 10. The return springs 140 (one of which is visible in FIG. 10) can then return the deployable devices 118a and 118b to the configuration shown at the top of FIG. 10.

Figure 11:
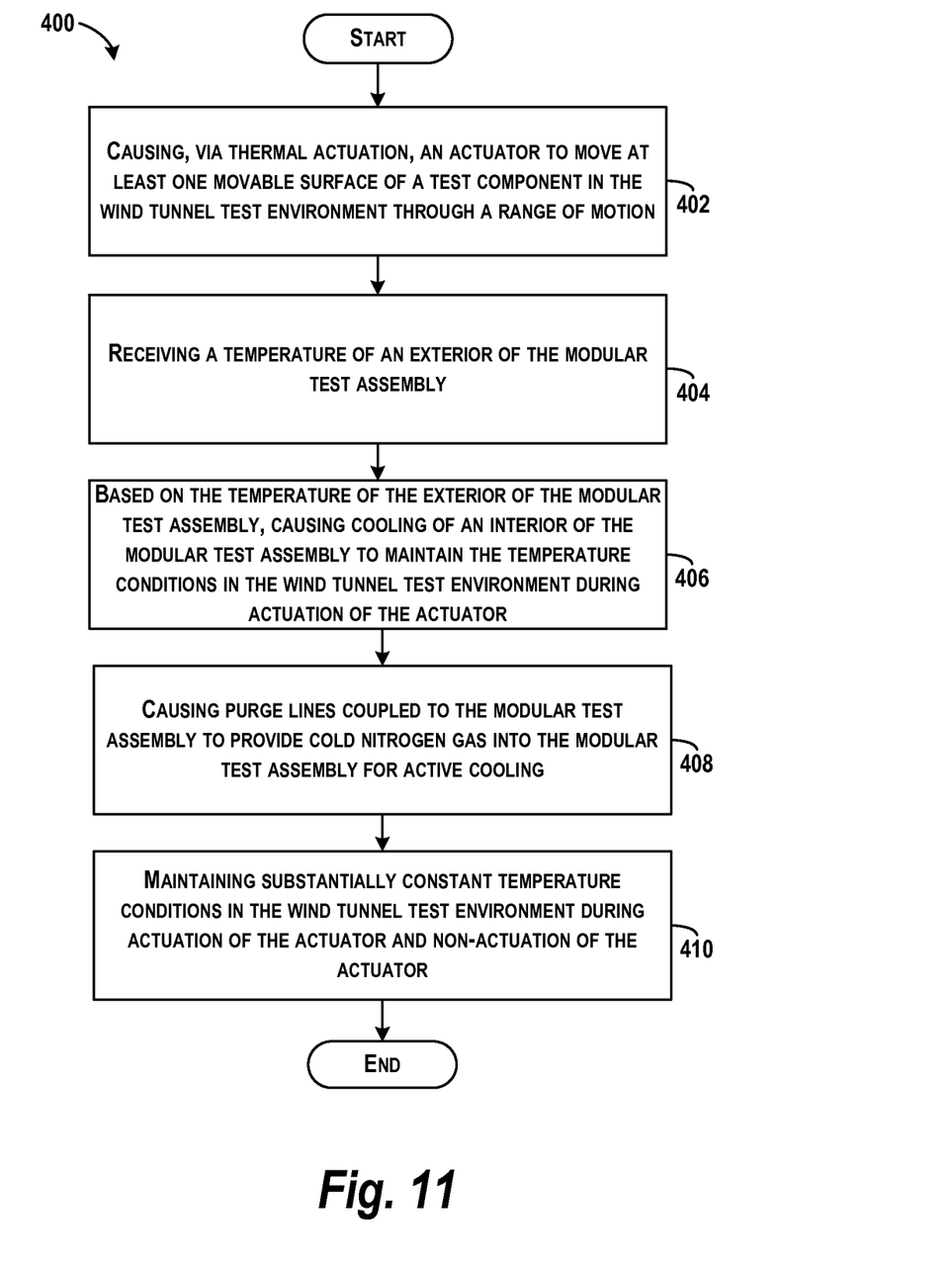
FIG. 11 shows a flowchart of an example method for remotely controlling and remotely actuating components in a wind tunnel test environment under ambient to cryogenic temperature conditions to reproduce aerodynamic flight Reynolds number conditions, according to an example embodiment.

FIG. 11 shows a flowchart of an example method 400 for remotely controlling and remotely actuating components in a wind tunnel test environment under ambient to cryogenic temperature conditions to reproduce aerodynamic flight Reynolds number conditions, according to an example embodiment. Method 400 shown in FIG. 11 presents an embodiment of a method that, for example, could be used with the system shown in FIG. 1, for example, and may be performed by a computing device (or components of a computing device) such as a client device or a server or may be performed by components of both a client device and a server. Example devices or systems may be used or configured to perform logical functions presented in FIG. 11. In some instances, components of the devices and/or systems may be configured to perform the functions such that the components are actually configured and structured (with hardware and/or software) to enable such performance. In other examples, components of the devices and/or systems may be arranged to be adapted to, capable of, or suited for performing the functions, such as when operated in a specific manner. Method 400 may include one or more operations, functions, or actions as illustrated by one or more of blocks 402-406. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

It should be understood that for this and other processes and methods disclosed herein, flowcharts show functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium or data storage, for example, such as a storage device including a disk or hard drive. The computer readable medium may include non-transitory computer readable medium or memory, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a tangible computer readable storage medium, for example.

In addition, each block in FIG. 11 may represent circuitry that is wired to perform the specific logical functions in the process. Alternative implementations are included within the scope of the example embodiments of the present disclosure in which functions may be executed out of order from that shown or discussed, including substantially concurrent or in reverse order, depending on the functionality involved, as would be understood by those reasonably skilled in the art.

At block 402, the method 400 includes causing, via thermal actuation, the actuator 120 to move the at least one movable surface 118 of the test component 116 in the wind tunnel test environment 104 through a range of motion. The actuator 120 is included within the modular test assembly 114 and is coupled to the at least one movable surface 118. Within examples, the actuator 120 comprises shape memory alloy (SMA) tubes that are thermally actuated to cause movement of the at least one movable surface 118, and the test component 116 includes a flap on a wing of aircraft, or an aileron for example, and the actuator 120 is coupled to hinges 140 of the flap to move the flap through the range of motion.

At block 404, the method 400 includes receiving a temperature of an exterior of the modular test assembly 114. The temperature of the exterior of the modular test assembly 114 may be immediately adjacent a surface of the modular test assembly 114, or proximal to the modular test assembly 114, for example. In other examples, a temperature of an interior of the modular test assembly 114 can be received as well. In still other examples, an ambient temperature of the modular test assembly 114 is determined by the sensors 122 and 124.

At block 406, the method 400 includes based on the temperature of the exterior of the modular test assembly 114, causing cooling of an interior of the modular test assembly 114 to maintain the temperature conditions in the wind tunnel test environment 104 during actuation of the actuator 120.

Within examples, as shown at block 408 in the method 400, causing cooling of the interior of the modular test assembly 114 includes causing purge lines 130 and 132 coupled to the modular test assembly 114 to provide cold nitrogen gas into the modular test assembly 114 for active cooling.

As shown at block 410 in the method 400 includes maintaining substantially constant temperature conditions in the wind tunnel test environment 104 during actuation of the actuator 120 as well as during non-actuation of the actuator 120.

Figure 12:
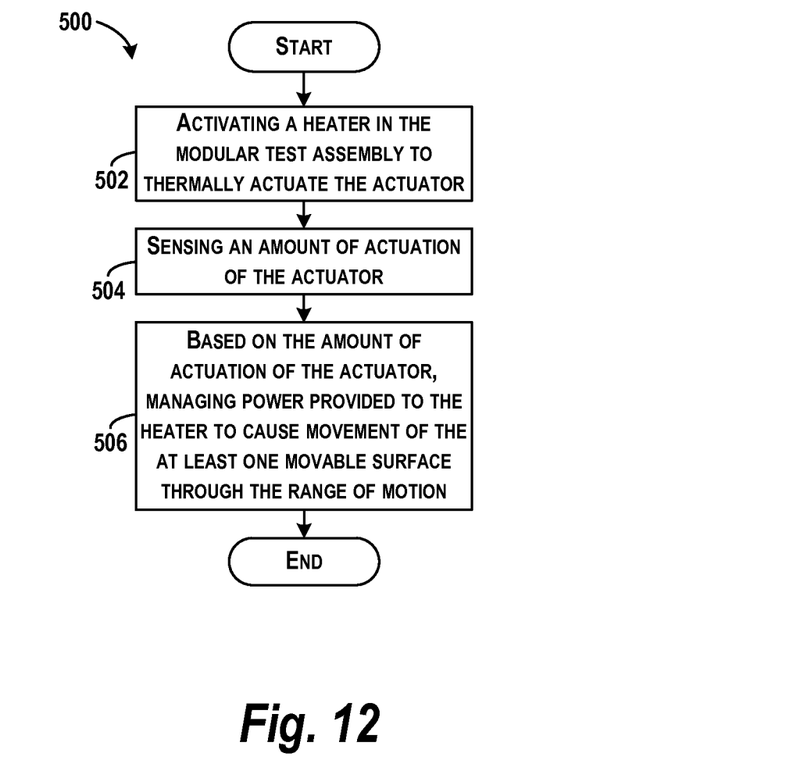
FIG. 12 shows a flowchart of an example method for activating and managing the heater, according to an example embodiment.

Within further examples, additional methods may be performed in combination with the method 400. For instance, FIG. 12 shows a flowchart of an example method 500 for activating and managing the heater 126, according to an example embodiment. At block 502, the method 500 includes activating a heater 126 in the modular test assembly 114 to thermally actuate the actuator 120. At block 504, the method 500 includes sensing an amount of actuation of the actuator 120 (e.g., such as an amount of deflection). An amount of actuation by the actuator 120 can be sensed by a strain gauge (e.g., determining twist of an SMA). At block 506, the method 500 includes based on the amount of actuation of the actuator 120, managing power provided to the heater 126 to cause movement of the at least one movable surface 118 through the range of motion. Providing less power may reduce heat output of the heater to reduce temperatures inside and outside the modular test assembly 114, for example.

Thermal management of the wind tunnel environment 104 through active cooling mechanisms enables cryogenic temperature conditions to reproduce aerodynamic flight Reynolds number conditions, for example. It is desirable to prevent or control an amount of temperature leakage from the modular test assembly 114 into the wind tunnel environment 104.

Examples herein are described with respect to a thermally controlled environment actuation assembly for use in testing aircraft components. Other testing uses may be beneficial as well, such as for testing of deep underwater vehicle systems, or other vehicles and/or surface interaction that may be exposed to cryogenic conditions.

Figure 13:
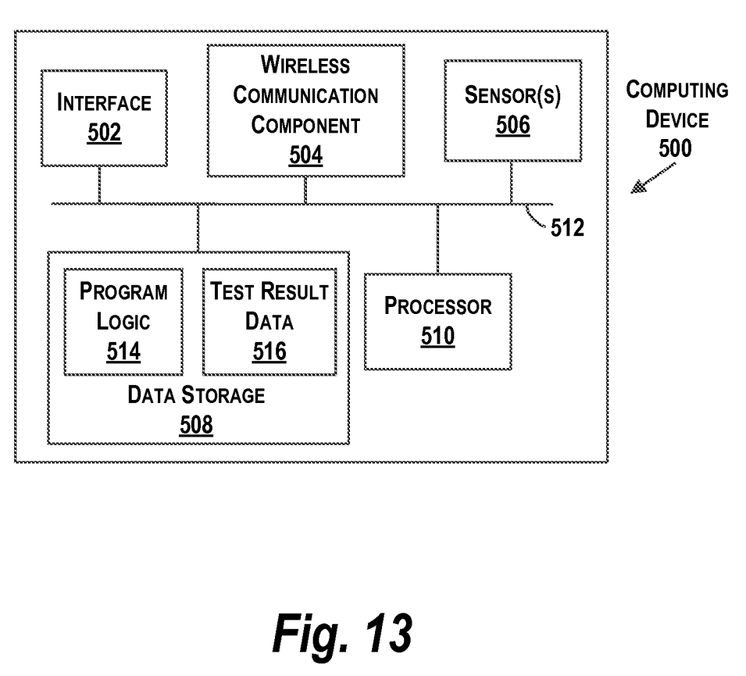
FIG. 13 illustrates a schematic drawing of an example computing device, according to an example embodiment.

As mentioned, portions of any of the methods described herein (e.g., the method 400) may be performed by a computing device (or components of a computing device), as well as by components of elements shown in FIG. 1. FIG. 13 illustrates a schematic drawing of an example computing device 500, according to an example embodiment. The computing device 500 in FIG. 13 may represent devices shown in FIG. 1 including the processors or the controller, or any of the blocks conceptually illustrating computing components, or the computing device 500 may represent a device for performing functions of the system in FIG. 1 in general. In some examples, some components illustrated in FIG. 13 may be distributed across multiple computing devices. However, for the sake of example, the components are shown and described as part of one example device 500. The computing device 500 may be or include a mobile device, desktop computer, email/messaging device, tablet computer, or similar device that may be configured to perform the functions described herein.

The computing device 500 may include an interface 502, a wireless communication component 504, sensor(s) 506, data storage 508, and a processor 510. Components illustrated in FIG. 13 may be linked together by a communication link 512. The computing device 500 may also include hardware to enable communication within the computing device 500 and between the computing device 500 and another computing device (not shown), such as a server entity. The hardware may include transmitters, receivers, and antennas, for example.

The interface 502 may be configured to allow the computing device 500 to communicate with another computing device (not shown), such as a server. Thus, the interface 502 may be configured to receive input data from one or more computing devices, and may also be configured to send output data to the one or more computing devices. In some examples, the interface 502 may also maintain and manage records of data received and sent by the computing device 500. The interface 502 may also include a receiver and transmitter to receive and send data. In other examples, the interface 502 may also include a user-interface, such as a keyboard, microphone, touchscreen, etc., to receive inputs as well.

The wireless communication component 504 may be a communication interface that is configured to facilitate wireless data communication for the computing device 500 according to one or more wireless communication standards. For example, the wireless communication component 504 may include a Wi-Fi communication component that is configured to facilitate wireless data communication according to one or more IEEE 802.11 standards. As another example, the wireless communication component 504 may include a Bluetooth communication component that is configured to facilitate wireless data communication according to one or more Bluetooth standards. Other examples are also possible.

The sensor 506 may include one or more sensors, or may represent one or more sensors included within the computing device 500. Example sensors include an accelerometer, gyroscope, pedometer, light sensors, microphone, camera, temperature, pressure, or other location and/or context-aware sensors.

The data storage 508 may store program logic 514 that can be accessed and executed by the processor 510. The data storage 508 may also store collected sensor data or test result data 516.

The description of the different advantageous arrangements has been presented for purposes of illustration and description, and is not intended to be exhaustive or limited to the embodiments in the form disclosed. Many modifications and variations will be apparent to those of ordinary skill in the art. Further, different advantageous embodiments may describe different advantages as compared to other advantageous embodiments. The embodiment or embodiments selected are chosen and described in order to explain the principles of the embodiments, the practical application, and to enable others of ordinary skill in the art to understand the disclosure. Various modifications, as are suited to the particular use, are contemplated.

What is claimed is:

1. A system for remotely controlling and remotely actuating components in a wind tunnel test environment that changes from room temperature to cryogenic temperature conditions to reproduce aerodynamic flight Reynolds number conditions, comprising:
    a modular test assembly mounted on a test component, wherein the test component includes at least one movable surface and is configured for placement in the wind tunnel;
    an actuator included within the modular test assembly and coupled to the at least one movable surface of the test component, wherein the actuator is thermally actuated to cause movement of the at least one movable surface;
    a temperature sensor to provide temperature of an exterior of the modular test assembly; and
    a controller in communication with the actuator and the temperature sensor, and configured to remotely cause the actuator to move the at least one movable surface through a range of motion, wherein the controller further receives the temperature of the exterior of the modular test assembly from the temperature sensor and causes cooling of an interior of the modular test assembly to maintain the temperature conditions in the wind tunnel test environment during actuation of the actuator.

2. The system of claim 1, wherein the temperature conditions include temperatures in a range of −250° F. to 100° F.

3. The system of claim 1, wherein the test component includes a flap on a wing of aircraft, and the actuator is coupled to a hinge of the flap to move the flap through the range of motion.

4. The system of claim 1, wherein the modular test assembly includes a heater to thermally actuate the actuator.

5. The system of claim 1, wherein the actuator comprises shape memory alloy (SMA) tubes that are thermally actuated to cause movement of the at least one movable surface.

6. The system of claim 5, wherein the modular test assembly provides a thermally isolated area such that a boundary layer between the modular test assembly and the wind tunnel test environment is thermally managed to prevent disturbance of the temperature conditions of the boundary layer during thermal actuation of the SMA tubes.

7. The system of claim 1, wherein the actuator comprises shape memory allow (SMA) tubes, and based on thermal actuation of the SMA tubes, the SMA tubes twist causing movement of the at least one movable surface.

8. The system of claim 1, wherein the controller further receives the temperature of the exterior of the modular test assembly from the temperature sensor and causes cooling of an interior of the modular test assembly to maintain substantially constant temperature conditions in the wind tunnel test environment during actuation of the actuator and non-actuation of the actuator.

9. The system of claim 1, wherein the controller wirelessly communicates with the actuator and the temperature sensor.

10. The system of claim 1, further comprising a plurality of data sensors for providing data indicative of one or more conditions in the wind tunnel test environment, wherein the plurality of data sensors include the temperature sensor and a pressure sensor.

11. The system of claim 1, further comprising purge lines coupled to the modular test assembly to provide cold nitrogen gas into the modular test assembly for active cooling.

12. The system of claim 1, further comprising an insulation liner on an inside of the modular test assembly to prevent heat dissipation.

13. The system of claim 1, further comprising:
    a heater in the modular test assembly to thermally actuate the actuator;
    a data sensor to sense an amount of actuation of the actuator, and
    wherein the controller receives an output of the data sensor and manages power provided to the heater to cause movement of the at least one movable surface through the range of motion based on the output of the data sensor.

14. A method for remotely controlling and remotely actuating components in a wind tunnel test environment that changes from room temperature to cryogenic temperature conditions to reproduce aerodynamic flight Reynolds number conditions, comprising:
    causing, via thermal actuation, an actuator to move at least one movable surface of a test component in the wind tunnel test environment through a range of motion, wherein the actuator is included within a modular test assembly and is coupled to the at least one movable surface;
    receiving a temperature of an exterior of the modular test assembly; and
    based on the temperature of the exterior of the modular test assembly, causing cooling of an interior of the modular test assembly to maintain the temperature conditions in the wind tunnel test environment during actuation of the actuator.

15. The method of claim 14, wherein the actuator comprises shape memory alloy (SMA) tubes that are thermally actuated to cause movement of the at least one movable surface.

16. The method of claim 14, further comprising maintaining substantially constant temperature conditions in the wind tunnel test environment during actuation of the actuator and non-actuation of the actuator.

17. The method of claim 14, wherein causing cooling of the interior of the modular test assembly to maintain the temperature conditions in the wind tunnel test environment during actuation of the actuator comprises causing purge lines coupled to the modular test assembly to provide cold nitrogen gas into the modular test assembly for active cooling.

18. The method of claim 14, further comprising:
    activating a heater in the modular test assembly to thermally actuate the actuator;
    sensing an amount of actuation of the actuator, and
    based on the amount of actuation of the actuator, managing power provided to the heater to cause movement of the at least one movable surface through the range of motion.

19. A non-transitory computer readable medium having stored thereon instructions that, upon being executed by a computing device, cause the computing device to perform functions comprising:
  causing, via thermal actuation, an actuator to move at least one movable surface of a test component in a wind tunnel test environment through a range of motion, wherein the actuator is included within a modular test assembly and is coupled to the at least one movable surface;
  receiving a temperature of an exterior of the modular test assembly; and
  based on the temperature of the exterior of the modular test assembly, causing cooling of an interior of the modular test assembly to maintain the temperature conditions in the wind tunnel test environment during actuation of the actuator, wherein the temperature conditions in the wind tunnel test environment change from room temperature to cryogenic temperature conditions to reproduce aerodynamic flight Reynolds number conditions.

20. The non-transitory computer readable medium of claim 19, wherein causing cooling of the interior of the modular test assembly to maintain the temperature conditions in the wind tunnel test environment during actuation of the actuator comprises causing purge lines coupled to the modular test assembly to provide cold nitrogen gas into the modular test assembly for active cooling.

* * * * *